United States Patent [19]
Zaranek

[11] Patent Number: 5,992,718
[45] Date of Patent: Nov. 30, 1999

[54] CONTAINER ATTACHMENT

[76] Inventor: Fred Zaranek, R. R.#3 Box 928, Saltsburg, Pa. 15681

[21] Appl. No.: 09/065,182

[22] Filed: Apr. 23, 1998

[51] Int. Cl.[6] ............................. B60R 7/00; B60R 11/06; B60N 3/00

[52] U.S. Cl. ......................... 224/311; 224/547; 224/901; 224/932; 224/282

[58] Field of Search ............................ 280/769; 224/311, 224/538, 282, 547, 55, 901, 932; 206/460, 470; 248/316.7, 205.3, 318, 683

[56] References Cited

U.S. PATENT DOCUMENTS

| | | | |
|---|---|---|---|
| 2,453,452 | 11/1985 | Nielson | 15/220.4 |
| 3,241,795 | 3/1966 | Frye | 248/205.5 |
| 3,311,338 | 3/1967 | Culley | 248/205.3 |
| 3,667,597 | 6/1972 | Hollister | 206/58 |
| 4,180,299 | 12/1979 | Tolerson | 312/242 |
| 4,416,483 | 11/1983 | Koch | 296/37.1 |
| 4,595,228 | 6/1986 | Chu | 296/37.7 |
| 4,776,623 | 10/1988 | Manning | 294/143 |
| 4,867,498 | 9/1989 | Delphia et al. | 296/37.7 |
| 5,065,970 | 11/1991 | Gross | 248/311.2 |
| 5,075,918 | 12/1991 | Zeltner et al. | 15/210 |
| 5,213,243 | 5/1993 | Landon | 224/277 |
| 5,231,728 | 8/1993 | Schillinger | 15/220.4 |
| 5,310,103 | 5/1994 | Weber et al. | 224/311 |
| 5,484,092 | 1/1996 | Cheney | 224/404 |
| 5,683,021 | 11/1997 | Setina | 224/311 |

FOREIGN PATENT DOCUMENTS

| | | | |
|---|---|---|---|
| 555 577 A1 | 8/1993 | European Pat. Off. | A47K 10/42 |
| 575 677 A1 | 12/1993 | European Pat. Off. | A47K 10/38 |

*Primary Examiner*—Daniel G. DePumpo
*Assistant Examiner*—Christopher Bottorff

[57] ABSTRACT

A new container attachment for attaching to a hood of a vehicle for holding a wipe cloth therein. The inventive device includes a mounting bracket, a container, and a lid. The mounting bracket having first and second spaced apart panels and a connecting portion connecting the panels of the mounting bracket together. The first panel of the mounting bracket is adapted for attachment to a structure. The container has base and a perimeter side wall. The perimeter side wall of the container has a front, and a back. The perimeter side wall of the container defines an interior space. The perimeter side wall of the container has a terminal edge which defines an opening into the interior space of the container. The lid has first and second surfaces, a front, and a back. The back of the lid is pivotally coupled to the back of the perimeter side wall of the container. The lid has a slot therethrough which extends between the front and back of the lid. The second panel of the mounting bracket is inserted into the slot of the lid.

10 Claims, 2 Drawing Sheets

CONTAINER ATTACHMENT

BACKGROUND OF THE INVENTION

1. Field of the Invention

The present invention relates to accessories for vehicles and more particularly pertains to a new container attachment for attaching to a hood of a vehicle for holding a wipe cloth therein.

2. Description of the Prior Art

The use of accessories for vehicles is known in the prior art. More specifically, accessories for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art accessories for vehicles include U.S. Pat. Nos. 5,231,728; 4,164,054; 2,453,452; EPO Patent No. EP 0 575 677 A1 (Inventor: Morand); EPO Pat. No. EP 0 555 577 A1 (Inventor: Morand); U.S. Pat. Nos. 3,311,338; and 5,075,918.

While these devices fulfill their respective, particular objectives and requirements, the aforementioned patents do not disclose a new container attachment. The inventive device includes a mounting bracket, a container, and a lid. The mounting bracket having first and second spaced apart panels and a connecting portion connecting the panels of the mounting bracket together. The first panel of the mounting bracket is adapted for attachment to a structure. The container has base and a perimeter side wall. The perimeter side wall of the container has a front, and a back. The perimeter side wall of the container defines an interior space. The perimeter side wall of the container has a terminal edge which defines an opening into the interior space of the container. The lid has first and second surfaces, a front, and a back. The back of the lid is pivotally coupled to the back of the perimeter side wall of the container. The lid has a slot therethrough which extends between the front and back of the lid. The second panel of the mounting bracket is inserted into the slot of the lid.

In these respects, the container attachment according to the present invention substantially departs from the conventional concepts and designs of the prior art, and in so doing provides an apparatus primarily developed for the purpose of attaching to a hood of a vehicle for holding a wipe cloth therein.

SUMMARY OF THE INVENTION

In view of the foregoing disadvantages inherent in the known types of accessories for vehicles now present in the prior art, the present invention provides a new container attachment construction wherein the same can be utilized for attaching to a hood of a vehicle for holding a wipe cloth therein.

The general purpose of the present invention, which will be described subsequently in greater detail, is to provide a new container attachment apparatus and method which has many of the advantages of the accessories for vehicles mentioned heretofore and many novel features that result in a new container attachment which is not anticipated, rendered obvious, suggested, or even implied by any of the prior art accessories for vehicles, either alone or in any combination thereof.

To attain this, the present invention generally comprises a mounting bracket, a container, and a lid. The mounting bracket having first and second spaced apart panels and a connecting portion connecting the panels of the mounting bracket together. The first panel of the mounting bracket is adapted for attachment to a structure. The container has base and a perimeter side wall. The perimeter side wall of the container has a front, and a back. The perimeter side wall of the container defines an interior space. The perimeter side wall of the container has a terminal edge which defines an opening into the interior space of the container. The lid has first and second surfaces, a front, and a back. The back of the lid is pivotally coupled to the back of the perimeter side wall of the container. The lid has a slot therethrough which extends between the front and back of the lid. The second panel of the mounting bracket is inserted into the slot of the lid.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new container attachment apparatus and method which has many of the advantages of the accessories for vehicles mentioned heretofore and many novel features that result in a new container attachment which is not anticipated, rendered obvious, suggested, or even implied by any of the prior art accessories for vehicles, either alone or in any combination thereof.

It is another object of the present invention to provide a new container attachment which may be easily and efficiently manufactured and marketed.

It is a further object of the present invention to provide a new container attachment which is of a durable and reliable construction.

An even further object of the present invention is to provide a new container attachment which is susceptible of a low cost of manufacture with regard to both materials and labor, and which accordingly is then susceptible of low prices of sale to the consuming public, thereby making such container attachment economically available to the buying public.

Still yet another object of the present invention is to provide a new container attachment which provides in the apparatuses and methods of the prior art some of the advantages thereof, while simultaneously overcoming some of the disadvantages normally associated therewith.

Still another object of the present invention is to provide a new container attachment for attaching to a hood of a vehicle for holding a wipe cloth therein.

Yet another object of the present invention is to provide a new container attachment which includes a mounting bracket, a container, and a lid. The mounting bracket having first and second spaced apart panels and a connecting portion connecting the panels of the mounting bracket together. The first panel of the mounting bracket is adapted for attachment to a structure. The container has base and a perimeter side wall. The perimeter side wall of the container has a front, and a back. The perimeter side wall of the container defines an interior space. The perimeter side wall of the container has a terminal edge which defines an opening into the interior space of the container. The lid has first and second surfaces, a front, and a back. The back of the lid is pivotally coupled to the back of the perimeter side wall of the container. The lid has a slot therethrough which extends between the front and back of the lid. The second panel of the mounting bracket is inserted into the slot of the lid.

Still yet another object of the present invention is to provide a new container attachment that provides a convenient location for storing a wipe cloth for use when working on the engine of vehicle.

Even still another object of the present invention is to provide a new container attachment that allows storage of items on the inside of a hood, especially the engine hood, of a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
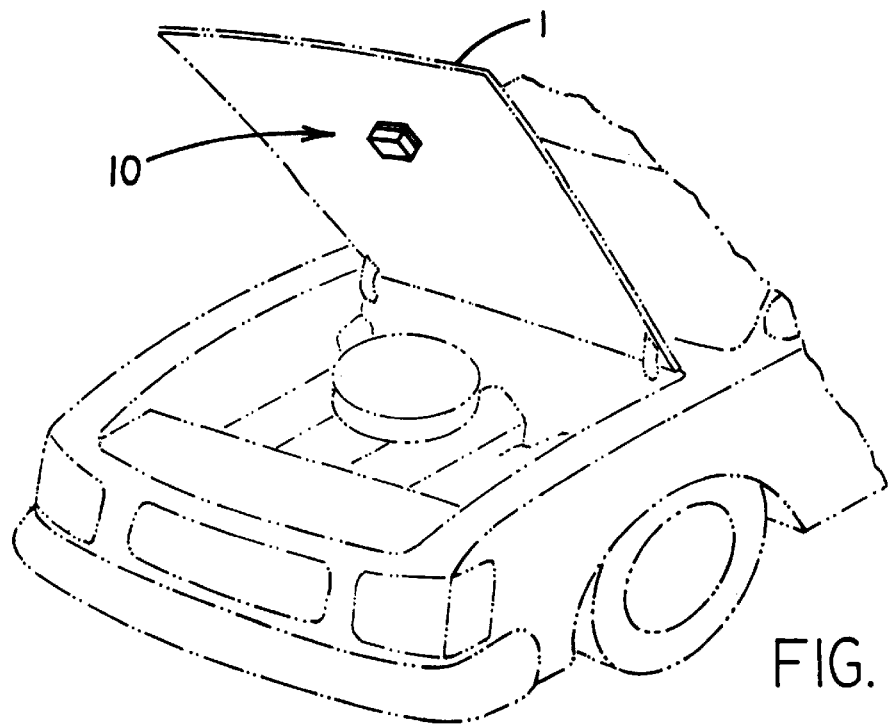
FIG. 1 is a schematic perspective view of a new container attachment on a hood of a vehicle according to the present invention.
Figure 2:
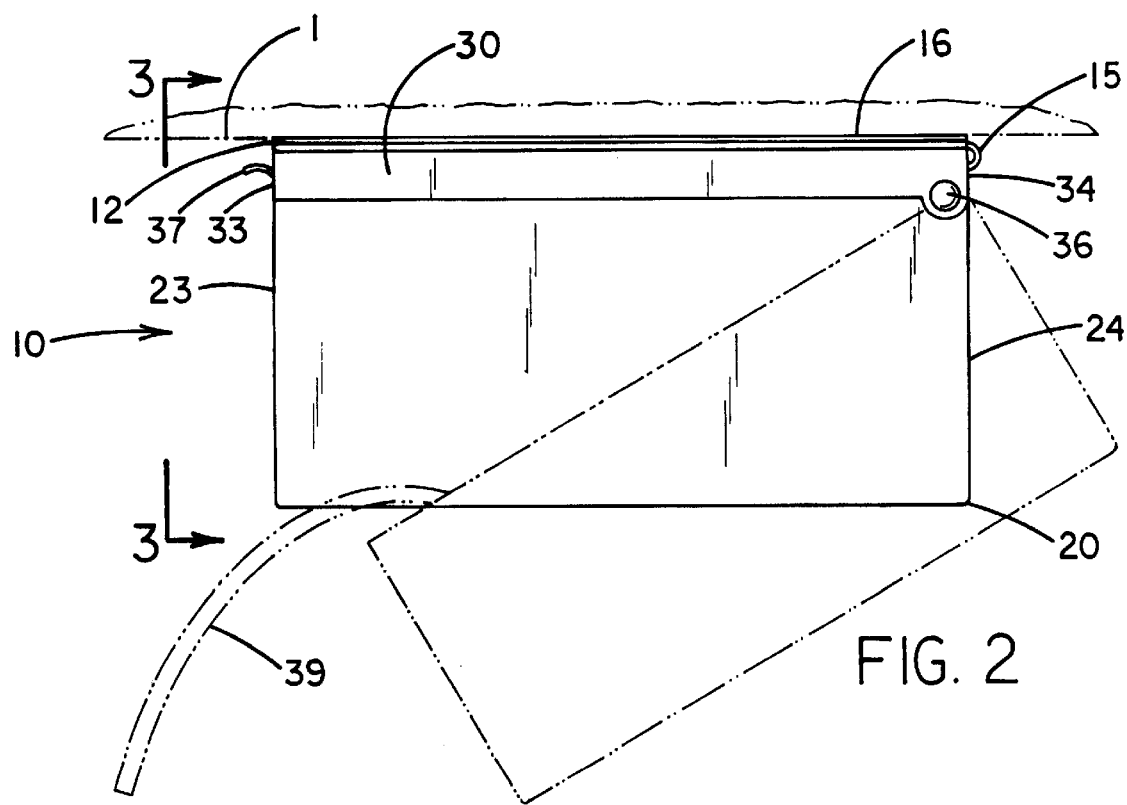
FIG. 2 is a schematic side view of the present invention.
Figure 3:
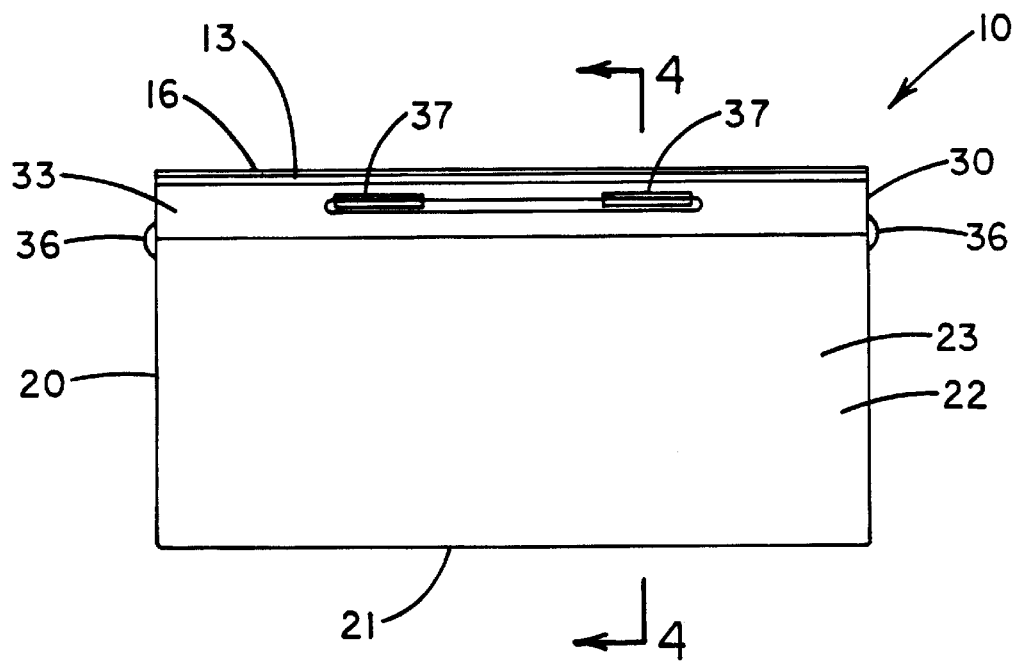
FIG. 3 is a schematic front side view of the present invention as seen from line 3—3 of FIG. 2.
Figure 4:
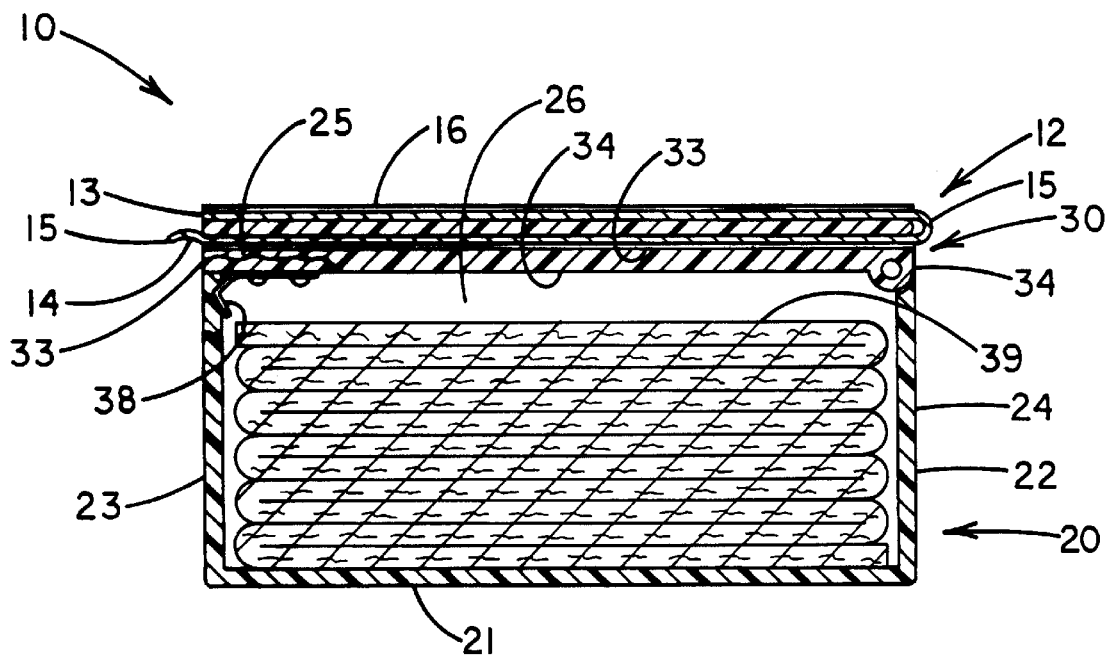
FIG. 4 is a schematic cross-sectional view of the present invention as taken from line 4—4 on FIG. 3.

With reference now to the drawings, and in particular to FIGS. 1 through 4 thereof, a new container attachment embodying the principles and concepts of the present invention and generally designated by the reference numeral 10 will be described.

As best illustrated in FIGS. 1 through 4, the container attachment 10 generally comprises a mounting bracket 12, a container 20, and a lid 30. The mounting bracket 12 having first and second spaced apart panels 13,14 and a connecting portion 15 connecting the panels 13,14 of the mounting bracket 12 together. The first panel 13 of the mounting bracket 12 is adapted for attachment to a structure 1. The container 20 has base 21 and a perimeter side wall 22. The perimeter side wall 22 of the container 20 has a front 23, and a back 24. The perimeter side wall 22 of the container 20 defines an interior space 26. The perimeter side wall 22 of the container 20 has a terminal edge 25 which defines an opening into the interior space 26 of the container 20. The lid 30 has first and second surfaces 31,32, a front 33, and a back 34. The back 34 of the lid 30 is pivotally coupled to the back 24 of the perimeter side wall 22 of the container 20. The lid 30 has a slot 35 therethrough which extends between the front 33 and back 34 of the lid 30. The second panel 14 of the mounting bracket 12 is inserted into the slot 35 of the lid 30.

In closer detail, the container attachment 10 is designed for attaching to the inside of a hood 1 of a vehicle. The mounting bracket 12 has first and second spaced apart panels 13,14 and an arcuate connecting portion 15. The connecting portion 15 connects the panels 13,14 of the mounting bracket 12 together at one end such that the mounting bracket 12 has a generally U-shaped cross-section. Ideally, the panels 13,14 of the mounting bracket 12 are substantially planar and substantially parallel to each other. The first panel 13 of the mounting bracket 12 is adapted for attachment to a structure inside of a hood 1. Preferably, an pressure sensitive adhesive 16 is provided on the first panel of the mounting bracket 12 for permitting adhesive 16 attachment of the first panel 13 of the mounting bracket 12 to a structure.

The container 20 has base 21 and a perimeter side wall 22 extending around the perimeter of the base 21 of the container 20. Preferably, the base 21 of the container 20 is generally rectangular with the perimeter side wall 22 of the container 20 having a front, a back and a pair of sides extending between the front and back 24 of the perimeter side wall 22. The perimeter side wall 22 of the container 20 defines an interior space 26. The perimeter side wall 22 of the container 20 has a terminal edge 25 defining an opening into the interior space 26 of the container 20. In the preferred embodiment, the opening into the interior space 26 is generally rectangular.

The lid 30 is preferably generally rectangular and has first and second surfaces 31,32, a front 33, a back 34, and a pair of sides. The lid 30 preferably substantially covers the opening into the interior space 26 of the container 20. The back 34 of the lid 30 is pivotally coupled to the back 24 of the perimeter side wall 22 of the container 20 preferably by a pair of pivot pins 36. The lid 30 has a slot 35 therethrough extending between the front 33 and back 34 of the lid 30. The second panel 14 is inserted into the slot 35 of the lid 30 such that the lid 30 and container 20 are attached to the inside of a hood 1 of a vehicle. The second panel 14 of the mounting bracket 12 has a free end distal the connecting portion 15. Preferably, the second panel 14 is extended through the slot 35 of the lid 30 such that free end of the second panel 14 outwardly extends from the slot 35 of the lid 30. The free end of the second panel 14 also preferably has an arcuate tab 37. The arcuate tab 37 is designed for holding the second panel 14 in the slot 35. In the preferred embodiment, the lid 30 has a spring clip latch 38 positioned adjacent the front 33 of the lid 30. The latch 38 is designed for holding the front 33 of the lid 30 to the front 23 of the perimeter side wall 22 of the container 20 when the lid 30 covers the opening into the interior space 26 of the container 20.

Ideally, a towel 39 is disposed in the interior space 26 of the container 20. The towel 39 is designed for allowing a user to wipe oil dip sticks and clean up dirt in the engine compartment of a vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container attachment for attaching to a structure, said container attachment comprising:

a mounting bracket having first and second spaced apart panels and a connecting portion connecting said panels of said mounting bracket together;

said first panel of said mounting bracket being adapted for attachment to a structure;

a container having base and a perimeter side wall;

said perimeter side wall of said container having a front, and a back, said perimeter side wall of said container defining an interior space, said perimeter side wall of said container having a terminal edge, said terminal edge of said perimeter side wall of said container defining an opening into said interior space of said container;

a lid having first and second surfaces, a front, and a back;

said back of said lid being pivotally coupled to said back of said perimeter side wall of said container;

said lid having a slot therethrough extending between said front and back of said lid; and said second panel being inserted into said slot of said lid.

2. The attachment of claim 1, wherein said panels of said mounting bracket are substantially planar and substantially parallel to each other.

3. The attachment of claim 1, wherein an adhesive is provided on said first panel of said mounting bracket for permitting adhesive attachment of said first panel of said mounting bracket to a structure.

4. The attachment of claim 1, wherein said base of said container is generally rectangular, wherein said opening into said interior space is generally rectangular, and wherein said lid is generally rectangular.

5. The attachment of claim 1, wherein said lid substantially covers said opening into said interior of said container.

6. The attachment of claim 1, wherein said second panel of said mounting bracket has a free end, said second panel being extending through said slot of said lid such that free end of said second panel outwardly extends from said slot of said lid.

7. The attachment of claim 6, wherein said free end of said second panel has an arcuate tab.

8. The attachment of claim 1, wherein said lid has a latch positioned adjacent said front of said lid, said latch being for holding said front of said lid to said front of said perimeter side wall of said container when said lid covers said opening into said interior space of said container.

9. The attachment of claim 1, further comprising a towel being disposed in said interior space of said container.

10. A container attachment for attaching to the inside of a hood of a vehicle, said container attachment comprising:

a mounting bracket having first and second spaced apart panels and an arcuate connecting portion connecting said panels of said mounting bracket together such that said mounting bracket has a generally U-shaped cross-section;

wherein said panels of said mounting bracket are substantially planar and substantially parallel to each other;

said first panel of said mounting bracket being adapted for attachment to a structure, wherein an adhesive is provided on said first panel of said mounting bracket for permitting adhesive attachment of said first panel of said mounting bracket to a structure;

a container having base and a perimeter side wall;

wherein said base of said container is generally rectangular;

said perimeter side wall of said container having a front, a back and a pair of sides, said perimeter side wall of said container defining an interior space, said perimeter side wall of said container having a terminal edge, said terminal edge of said perimeter side wall of said container defining an opening into said interior space of said container, wherein said opening into said interior space is generally rectangular;

a lid being generally rectangular and having first and second surfaces, a front, a back, and a pair of sides, said lid substantially covering said opening into said interior of said container;

said back of said lid being pivotally coupled to said back of said perimeter side wall of said container;

said lid having a slot therethrough extending between said front and back of said lid;

said second panel being inserted into said slot of said lid;

said second panel of said mounting bracket having a free end, said second panel being extending through said slot of said lid such that free end of said second panel outwardly extends from said slot of said lid, said free end of said second panel having an arcuate tab;

said lid having a latch positioned adjacent said front of said lid, said latch being for holding said front of said lid to said front of said perimeter side wall of said container when said lid covers said opening into said interior space of said container;

a towel being disposed in said interior space of said container.

* * * * *